US012676655B2

(12) United States Patent
Zhang et al.

(10) Patent No.: US 12,676,655 B2
(45) Date of Patent: Jul. 7, 2026

(54) CSI REPORTING METHOD, CSI RECEIVING METHOD, AND CORRESPONDING APPARATUS

(71) Applicant: HUAWEI TECHNOLOGIES CO., LTD., Shenzhen (CN)

(72) Inventors: Yongping Zhang, Beijing (CN); Yingnan Zhou, Beijing (CN); Zheng Yu, Beijing (CN); Tie Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 542 days.

(21) Appl. No.: 18/172,501

(22) Filed: Feb. 22, 2023

(65) Prior Publication Data

US 2023/0198595 A1     Jun. 22, 2023

Related U.S. Application Data

(63) Continuation of application No. PCT/CN2021/092991, filed on May 11, 2021.

(30) Foreign Application Priority Data

Aug. 26, 2020     (CN) .......................... 202010872738.2

(51) Int. Cl.
| | |
|---|---|
| H04W 72/12 | (2023.01) |
| H04B 7/06 | (2006.01) |
| H04L 1/1812 | (2023.01) |
| H04L 41/0866 | (2022.01) |

(52) U.S. Cl.
CPC ......... H04B 7/0626 (2013.01); H04L 1/1812 (2013.01); H04L 41/0866 (2013.01)

(58) Field of Classification Search
CPC . H04W 24/10; H04W 72/0446; H04W 72/20; H04W 72/21; H04W 72/542
See application file for complete search history.

(56) References Cited

U.S. PATENT DOCUMENTS

| | | | |
|---|---|---|---|
| 2013/0329691 A1 | 12/2013 | Kim et al. | |
| 2019/0165846 A1* | 5/2019 | Kim ..................... | H04B 7/0626 |
| 2022/0085856 A1* | 3/2022 | Shi ......................... | H04L 5/0053 |
| 2022/0407576 A1* | 12/2022 | Muruganathan ...... | H04L 5/0023 |

FOREIGN PATENT DOCUMENTS

| | | | | |
|---|---|---|---|---|
| CA | 3004405 A1 * | 5/2017 | .......... | H04L 5/0023 |
| CA | 3081676 A1 * | 2/2020 | .......... | H04B 17/318 |
| CN | 111263399 A | 6/2020 | | |

(Continued)

OTHER PUBLICATIONS

Japanese Office Action issued in corresponding Japanese Application No. 2023-513514, dated Mar. 18, 2024, pp. 1-15.

(Continued)

*Primary Examiner* — Phuc H Tran

(74) *Attorney, Agent, or Firm* — HAUPTMAN HAM, LLP

(57) ABSTRACT

Embodiments of this application relate to a channel state information (CSI) reporting method, a CSI receiving method, and a corresponding apparatus. A terminal device sets a CSI state to invalid when a configuration fuzzy period arrives. The terminal device reports preset CSI when determining that the CSI state is invalid. A network device receives the preset CSI.

20 Claims, 5 Drawing Sheets

(56)　　　　　　　References Cited

FOREIGN PATENT DOCUMENTS

| EP | 2941040 | A1 | 11/2015 | | |
|----|---------|----|---------|--|--|
| WO | 2019192381 | A1 | 10/2019 | | |
| WO | WO-2020088607 | A1 * | 5/2020 | ........... | H04L 5/0057 |

OTHER PUBLICATIONS

International Search Report issued in corresponding International Application No. PCT/CN2021/092991, dated Aug. 10, 2021, pp. 1-8.
India Office Action issued in corresponding India Application No. 202317013868, dated May 31, 2024, pp. 1-6.

\* cited by examiner

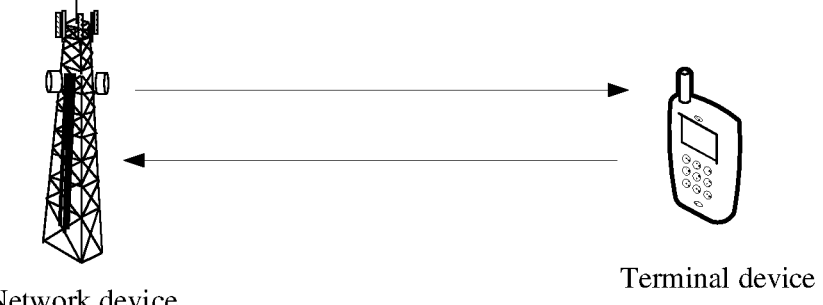

Network device                          Terminal device

FIG. 3

```
  ╭─────────╮                      ╭─────────╮
  │Terminal │                      │ Network │
  │ device  │                      │ device  │
  ╰─────────╯                      ╰─────────╯
      │                                 │
┌─────────────────────────────┐         │
│ S401: Determine a CSI state  │         │
└─────────────────────────────┘         │
      │                                 │
      │    S402: The terminal device    │
      │    sends preset CSI when the    │
      │      CSI state is invalid       │
      │────────────────────────────────▶│
      │                                 │
      │          ┌──────────────────────────────────┐
      │          │  S403: Receive the preset CSI     │
      │          └──────────────────────────────────┘
      │                                 │
```

FIG. 4

S501: The network device sends a preset message, and the terminal device receives the preset message S502: When valid CSI cannot be obtained due to the preset message before a CSI reporting occasion arrives, the terminal device sends preset CSI when the CSI reporting occasion arrives S503: Receive the preset CSI Apparatus 600

Processing unit 601

Sending unit 602

Receiving unit 603

CSI REPORTING METHOD, CSI RECEIVING METHOD, AND CORRESPONDING APPARATUS

CROSS-REFERENCE TO RELATED APPLICATIONS

This application is a continuation of International Application No. PCT/CN2021/092991, filed on May 11, 2021, which claims priority to Chinese Patent Application No. 202010872738.2, filed on Aug. 26, 2020. The disclosures of the aforementioned applications are hereby incorporated by reference in their entireties.

TECHNICAL FIELD

This application relates to the field of communication technologies, and in particular, to a channel state information (CSI) reporting method, a CSI receiving method, and a corresponding apparatus.

BACKGROUND

A process in which a network device performs CSI report configuration or reconfiguration, serving cell activation, bandwidth part (BWP) switching, semi-persistent CSI reporting (SP-CSI) activation, or the like on a terminal device generally includes the following operations: Operation 1: The network device delivers configuration or activation signaling. Operation 2: The terminal device correctly receives the signaling. Operation 3: The terminal device completes corresponding configuration based on the signaling, and can normally operate based on a new configuration or activation command. In the foregoing three-operation process, a time of the third operation is fuzzy for the network device. Because terminal devices have different processing capabilities, times required for completing corresponding configuration are also different. Even for the same terminal device in different states, times required for completing corresponding configuration are also different.

Due to existence of a fuzzy period, the network device often misunderstands a CSI reporting state of the terminal device. For example, after the network device delivers the configuration or activation signaling for a period of time, the network device assumes that the terminal device has completed corresponding configuration or activation and therefore reports CSI in uplink control information (UCI). However, actually, the terminal device has not completed the corresponding configuration, and does not report the CSI in the UCI. Alternatively, after the network device delivers the configuration or activation signaling for a period of time, the network device assumes that the terminal device has not completed corresponding configuration or activation and therefore does not report CSI in UCI. However, actually, the terminal device has completed the corresponding configuration or activation, and reports the CSI in the UCI.

In either of the foregoing cases, a quantity of information bits of the UCI from a perspective of the network device is inconsistent with an actual quantity of information bits of the UCI. Consequently, an error occurs in blind detection performed on the UCI by the network device. As a result, the UCI is discarded. However, in an actual case, in addition to the CSI, the UCI may further include other uplink data, for example, a hybrid automatic repeat request (HARQ) feedback. As a result, the other uplink data is also discarded, and link performance is greatly affected.

SUMMARY

Embodiments of this application provide a CSI reporting method, a CSI receiving method, and a corresponding apparatus, to improve uplink transmission performance.

According to a first aspect, a CSI reporting method is provided. The method may be applied to a terminal device, or may be applied to a chip in a terminal device. For example, the method may be applied to the terminal device. In the method, the terminal device determines a CSI state, and sends preset CSI when the CSI state is invalid.

In this embodiment of this application, the CSI state for the terminal device in a configuration fuzzy period is invalid. Therefore, the terminal device sends the preset CSI when the CSI state is invalid. In this way, the terminal device and a network device can have consistent understanding of whether the CSI needs to be discarded in the configuration fuzzy period (that is, the CSI is not discarded, and the terminal device reports the preset CSI), thereby avoiding a problem in the conventional technologies that other important uplink information (for example, a HARQ feedback) is lost because the network device and the terminal device have inconsistent understanding of whether the CSI needs to be discarded in the configuration fuzzy period. Therefore, uplink transmission performance can be improved.

In a possible implementation, the determining a CSI state includes: determining the CSI state when a CSI reading occasion arrives.

In this implementation, the terminal device determines the CSI state when the CSI reading occasion arrives. In this way, a problem of incorrectly determining the CSI state due to premature determining of the CSI state can be avoided. In addition, a problem that the CSI cannot be reported in time because the CSI state is determined too late can be avoided, thereby improving reliability of the solution.

In a possible implementation, the reading occasion is associated with a CSI reporting occasion and arrives before the CSI reporting occasion. The sending preset CSI is sending the preset CSI when the CSI reporting occasion arrives.

In this implementation, the reading occasion is associated with the CSI reporting occasion, to ensure accuracy of CSI content reported by the terminal device in each CSI reporting occasion, thereby further improving reliability of the solution.

In a possible implementation, the CSI state is set to invalid for the received preset message.

In this implementation, a moment at which the terminal device sets the CSI state to invalid is specified, that is, sets the CSI state to invalid for the received preset message, thereby further improving reliability of the solution.

In a possible implementation, the preset message is one of the following messages: a CSI report configuration message; a CSI reconfiguration message; a serving cell activation message; a bandwidth part switching message; and a semi-persistent CSI reporting activation message.

It should be understood that the foregoing five messages are merely examples. A specific type of the preset message is not limited in this embodiment of this application.

In a possible implementation, the CSI state is set to valid when the CSI is obtained through calculation.

In this implementation, if the terminal device obtains the CSI through calculation, it indicates that the configuration fuzzy period has ended (that is, configuration has been completed), and the terminal device can complete CSI measurement and generate valid CSI information. In this case, the CSI state is set to valid in time. Therefore, the terminal device starts to report the valid CSI, thereby further improving uplink transmission performance.

In a possible implementation, the preset CSI is default CSI.

According to a second aspect, a CSI reporting method is provided. The method may be applied to a terminal device, or may be applied to a chip in a terminal device. For example, the method may be applied to a terminal device. In the method, the terminal device receives a preset message; and when valid CSI cannot be obtained due to the preset message before a CSI reporting occasion arrives, sends preset CSI when the CSI reporting occasion arrives.

In this embodiment of this application, the terminal device in this embodiment of this application receives the preset message from a network device; and when the valid CSI cannot be obtained due to the preset message before the CSI reporting occasion arrives, sends the preset CSI when the CSI reporting occasion arrives. In this way, the terminal device and the network device can have consistent understanding of whether the CSI needs to be discarded in a configuration fuzzy period (that is, the CSI is not discarded, and the preset CSI is reported), thereby avoiding a problem in the conventional technologies that other important uplink information (for example, a HARQ feedback) is lost because the network device and the terminal device have inconsistent understanding of whether the CSI needs to be discarded in the configuration fuzzy period. Therefore, uplink transmission performance can be improved.

In a possible implementation, the preset message is one of the following messages: a CSI report configuration message; a CSI reconfiguration message; a serving cell activation message; a bandwidth part switching message; and a semi-persistent CSI reporting activation message.

It should be understood that the foregoing five messages are merely examples. A specific type of the preset message is not limited in this embodiment of this application.

In a possible implementation, the preset CSI is default CSI.

According to a third aspect, a CSI receiving method is provided. The method may be applied to a network device, or may be applied to a chip in a network device. For example, the method may be applied to the network device. In the method, the network device sends a preset message; and receives preset CSI in a CSI reporting occasion.

In a possible implementation, the preset message is one of the following messages: a CSI report configuration message; a CSI reconfiguration message; a serving cell activation message; a bandwidth part switching message; and a semi-persistent CSI reporting activation message.

In a possible implementation, the preset CSI is default CSI.

According to a fourth aspect, a communication apparatus is provided, and may be, for example, a terminal device or a chip device disposed in a terminal device. The apparatus includes modules configured to perform the method according to any one of the first aspect or the possible implementations of the first aspect.

For example, the apparatus may include: a processing unit, configured to determine a CSI state; and a sending unit, configured to send preset CSI when the CSI state is invalid.

In a possible implementation, the processing unit is configured to determine the CSI state when a CSI reading occasion arrives.

In a possible implementation, the reading occasion is associated with a CSI reporting occasion and arrives before the CSI reporting occasion. The processing unit is configured to send the preset CSI when the CSI reporting occasion arrives.

In a possible implementation, the apparatus further includes a receiving unit, configured to receive a preset message. The processing unit is further configured to set the CSI state to invalid for the received preset message.

In a possible implementation, the preset message is one of the following messages: a CSI report configuration message; a CSI reconfiguration message; a serving cell activation message; a bandwidth part switching message; and a semi-persistent CSI reporting activation message.

In a possible implementation, the processing unit is further configured to set the CSI state to valid when the CSI is obtained through calculation.

In a possible implementation, the preset CSI is default CSI.

According to a fifth aspect, a communication apparatus is provided, and may be, for example, a terminal device or a chip device disposed in a terminal device. The apparatus includes modules configured to perform the method according to any one of the second aspect or the possible implementations of the second aspect.

For example, the apparatus may include: a receiving unit, configured to receive a preset message; and a sending unit, configured to: when valid CSI cannot be obtained due to the preset message before a CSI reporting occasion arrives, send preset CSI when the CSI reporting occasion arrives.

In a possible implementation, the preset message is one of the following messages: a CSI report configuration message; a CSI reconfiguration message; a serving cell activation message; a bandwidth part switching message; and a semi-persistent CSI reporting activation message.

In a possible implementation, the preset CSI is default CSI.

According to a sixth aspect, a communication apparatus is provided, and may be, for example, a network device or a chip device disposed in a network device. The apparatus includes modules configured to perform the method according to any one of the third aspect or the possible implementations of the third aspect.

For example, the apparatus may include: a sending unit, configured to send a preset message; and a receiving unit, configured to receive preset CSI in a CSI reporting occasion.

In a possible implementation, the preset message is one of the following messages: a CSI report configuration message; a CSI reconfiguration message; a serving cell activation message; a bandwidth part switching message; and a semi-persistent CSI reporting activation message.

In a possible implementation, the preset CSI is default CSI.

According to a seventh aspect, a communication apparatus is provided, including at least one processor and a communication interface communicatively connected to the at least one processor. The at least one processor executes instructions stored in a memory, so that the apparatus performs, by using the communication interface, the method according to any one of the first aspect or the possible implementations of the first aspect.

Optionally, the memory is located outside the apparatus.

Optionally, the apparatus includes the memory. The memory is connected to the at least one processor, and the memory stores the instructions that can be executed by the at least one processor.

According to an eighth aspect, a communication apparatus is provided, including at least one processor and a communication interface communicatively connected to the at least one processor. The at least one processor executes instructions stored in a memory, so that the apparatus performs, by using the communication interface, the method according to any one of the second aspect or the possible implementations of the second aspect.

Optionally, the memory is located outside the apparatus.

Optionally, the apparatus includes the memory. The memory is connected to the at least one processor, and the memory stores the instructions that can be executed by the at least one processor.

According to a ninth aspect, a communication apparatus is provided, including at least one processor and a communication interface communicatively connected to the at least one processor. The at least one processor executes instructions stored in a memory, so that the apparatus performs, by using the communication interface, the method according to any one of the third aspect or the possible implementations of the third aspect.

Optionally, the memory is located outside the apparatus.

Optionally, the apparatus includes the memory. The memory is connected to the at least one processor, and the memory stores the instructions that can be executed by the at least one processor.

According to a tenth aspect, a computer-readable storage medium is provided, including programs or instructions. When the programs or the instructions are run on a computer, the method according to any one of the first aspect or the possible implementations of the first aspect is performed.

According to an eleventh aspect, a computer-readable storage medium is provided, including programs or instructions. When the programs or the instructions are run on a computer, the method according to any one of the second aspect or the possible implementations of the second aspect is performed.

According to a twelfth aspect, a computer-readable storage medium is provided, including programs or instructions. When the programs or the instructions are run on a computer, the method according to any one of the third aspect or the possible implementations of the third aspect is performed.

According to a thirteenth aspect, a chip is provided. The chip is coupled to a memory, and is configured to read and execute programs and instructions stored in the memory, so that the method according to any one of the first aspect or the possible implementations of the first aspect is performed.

According to a fourteenth aspect, a chip is provided. The chip is coupled to a memory, and is configured to read and execute programs and instructions stored in the memory, so that the method according to any one of the second aspect or the possible implementations of the second aspect is performed.

According to a fifteenth aspect, a chip is provided. The chip is coupled to a memory, and is configured to read and execute programs and instructions stored in the memory, so that the method according to any one of the third aspect or the possible implementations of the third aspect is performed.

According to a sixteenth aspect, a computer program product is provided, including instructions. When the instructions are run on a computer, the method according to any one of the first aspect or the possible implementations of the first aspect is performed.

According to a seventeenth aspect, a computer program product is provided, including instructions. When the instructions are run on a computer, the method according to any one of the second aspect or the possible implementations of the second aspect is performed.

According to an eighteenth aspect, a computer program product is provided, including instructions. When the instructions are run on a computer, the method according to any one of the third aspect or the possible implementations of the third aspect is performed.

BRIEF DESCRIPTION OF DRAWINGS

FIG. 3 is a diagram of network architecture of a communication system to which an embodiment of this application is applicable;

FIG. 4 is a flowchart of a CSI reporting method according to an embodiment of this application;

DESCRIPTION OF EMBODIMENTS

The 5th generation (5G) wireless access system standard new radio (NR) is based on a multiple-input multiple-output (MIMO) technology. To improve downlink performance, that is, performance of a link from a network device to a terminal device, a closed-loop MIMO operation manner may be used.

Figures 1, 2:
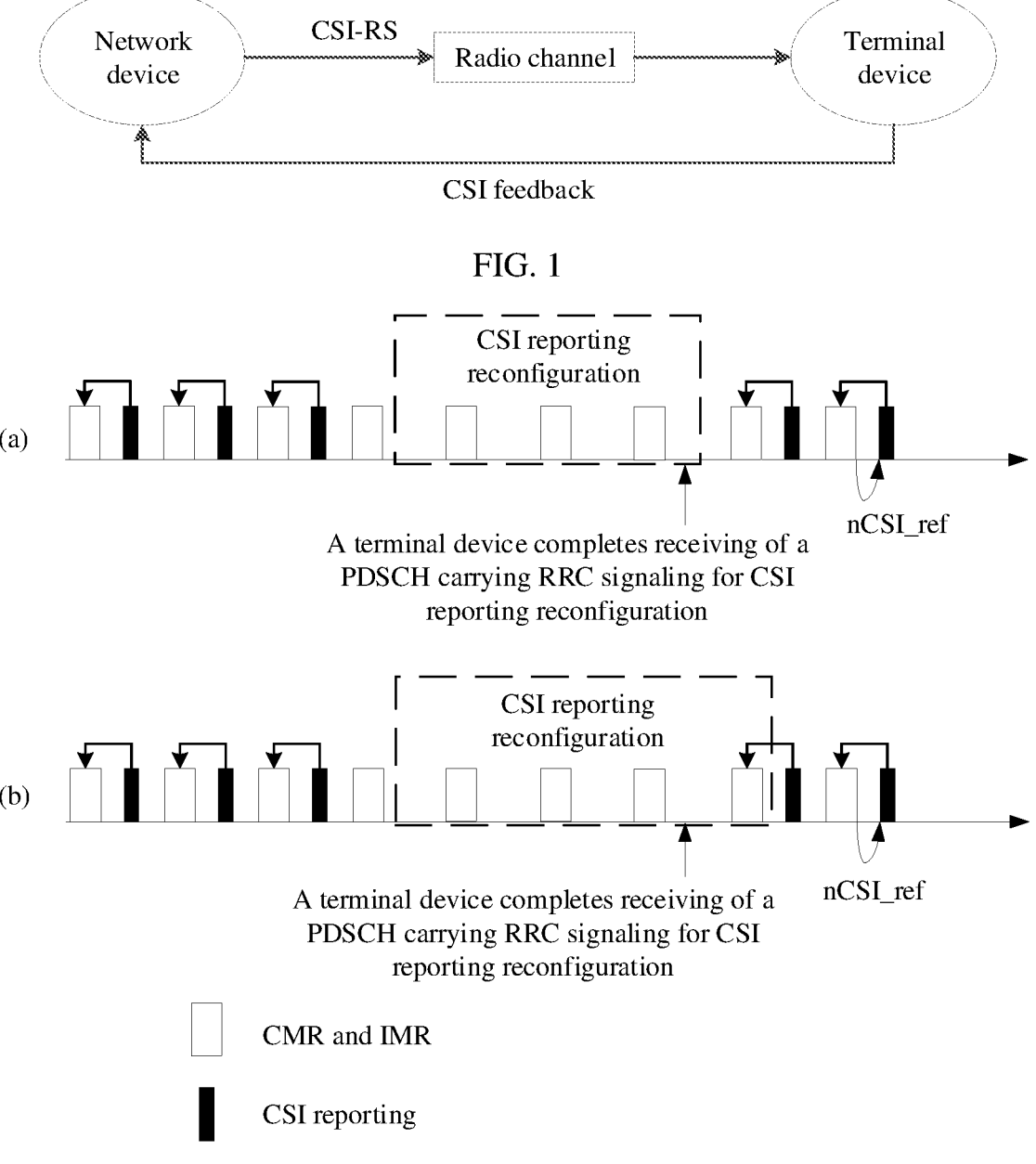
FIG. 1 is a schematic diagram of a structure of a possible closed-loop MIMO system.
FIG. 2 is a schematic diagram of two CSI report reconfiguration scenarios.

FIG. 1 is a schematic diagram of a structure of a possible closed-loop MIMO system. As shown in FIG. 1, a network device may determine, based on channel state information (CSI) reported by a terminal device, a parameter used during data transmission, to improve spectral efficiency.

CSI reporting may be periodic, semi-persistent, or aperiodic.

(1) Periodic CSI reporting (P-CSI): The network device configures, by using higher layer signaling (for example, radio resource control (RRC) signaling), the terminal device to periodically report CSI. The terminal device performs channel measurement and interference measurement by using periodic CSI-RS resources, and reports a CSI feedback on a physical uplink control channel (PUCCH) at fixed time intervals. In the periodic CSI reporting, a channel measurement resource (CMR) and an interference measurement resource (IMR) that are used by the terminal device for measurement are both periodically sent by the network device. Related parameters such as a period and resource mapping are all configured by using RRC signaling. Parameters such as a CSI reporting period and a PUCCH resource used for reporting are also configured by using RRC signaling.

(2) Semi-persistent CSI reporting (SP-CSI): When the terminal device is configured to perform semi-persistent CSI reporting, the terminal device starts CSI reporting only after receiving first downlink signaling sent by the network device, and ends the CSI reporting after receiving second downlink signaling. Between moments of delivering the two pieces of downlink signaling, the terminal device performs periodic CSI measurement and CSI reporting. A CMR and an IMR used for the semi-persistent CSI reporting may be periodically or semi-persistently sent. The semi-persistent CSI reporting may be performed by using a PUCCH resource. The network device may activate and deactivate the semi-persistent CSI reporting by using downlink higher layer signaling (for example, control element (CE) signaling of a media access control (MAC) layer). The semi-persistent CSI reporting may also be performed by using a physical uplink shared channel (PUSCH) resource (that is, SP CSI on PUCCH). The network device may activate and deactivate the semi-persistent CSI reporting by using physical layer downlink control signaling (DCI) (that is, SP CSI on PUSCH). Regardless of SP CSI on PUCCH or SP CSI on PUSCH, the network device configures, for the terminal device by using RRC signaling, measurement parameters such as a measurement amount and a measurement bandwidth required by the terminal device.

(3) Aperiodic CSI reporting (AP-CSI): The network device first semi-statically configures configuration parameters of a plurality of times of CSI reporting for the terminal device by using downlink RRC signaling, and triggers one or more times of CSI reporting by using DCI. The terminal device performs CSI measurement based on the configuration parameters of the CSI reporting, and reports a CSI measurement result by using a PUSCH. It should be noted that although aperiodic CSI measurement and reporting and semi-persistent CSI measurement and reporting are similar and both need to be triggered by the network device, deactivation does not need to be performed after the aperiodic CSI measurement and reporting are triggered by using the DCI, and measurement and reporting are performed only once. A CMR and an IMR used for the aperiodic CSI reporting may be periodically, semi-persistently, or aperiodically sent.

In the foregoing three types of CSI reporting, configuration parameters required in a CSI reporting process, for example, configuration parameters such as a reporting amount (a rank indicator (RI), a channel quality indicator (CQI), a precoding matrix indicator (PMI)) and a reporting bandwidth are all configured by the network device for the terminal device by using RRC signaling.

Because it takes a specific time for the terminal device to perform CSI measurement and prepare for CSI reporting, to ensure that the terminal device has enough time to calculate CSI and prepare for CSI information reporting, a CSI reference resource is further defined in NR.

A time domain location of the CSI reference resource is in several slots before a slot for the CSI reporting. If an uplink resource location used for CSI reporting is an n' uplink slot, a time domain location of a reference resource for the CSI reporting is n-nCSI_ref.

Herein, $$n = \left\lfloor n' \frac{2^{\mu_{DL}}}{2^{\mu_{UL}}} \right\rfloor,$$

$\mu_{DL}$, and $\mu_{UL}$ respectively represent configuration parameters of uplink and downlink subcarrier spacings. For example, if a downlink subcarrier spacing is 15 kHz, $\mu_{DL}=0$; if a downlink subcarrier spacing is 30 kHz, $\mu_{DL}=1$; if a downlink subcarrier spacing is 60 kHz, $\mu_{DL}=2$; if a downlink subcarrier spacing is 120 kHz, $\mu_{DL}=3$.

Herein, n-nCSI_ref is related to a CSI reporting type. For example, for the periodic or semi-persistent CSI reporting, if a quantity of CSI-RS resources that are used for channel measurement and that are bound for the CSI reporting is 1, nCSI_ref is a minimum integer greater than or equal to $4 \times 2^{\mu_{DL}}$. Therefore, a slot whose time domain location is n-nCSI_ref is a valid downlink slot. For the periodic or semi-persistent CSI reporting, if a quantity of CSI-RS resources that are used for channel measurement and that are bound for CSI reporting is greater than 1, nCSI_ref is a minimum integer greater than or equal to $5 \times 2^{\mu_{DL}}$. Therefore, n-nCSI_ref is a valid downlink slot.

In terms of spectrum use, NR supports a carrier aggregation (CA) technology. A plurality of carriers may be configured for the network device and the terminal device. One of these carriers is defined as a primary carrier. The network device may activate or deactivate any carrier other than the primary carrier by using MAC CE signaling. NR further defines a plurality of bandwidth parts (BWP) on each carrier. Each carrier has only one activated BWP. The network device may change the activated BWP by using downlink control information (DCI), or may switch a BWP by using RRC signaling. The CSI reporting is configured based on a carrier. To be specific, configuration information of the CSI reporting indicates a carrier to which the CSI reporting belongs. A CSI-RS/CSI-IM resource is configured based on a BWP.

The 3rd generation partnership project (3GPP) specifies in the NR protocol that after CSI report configuration or reconfiguration, serving cell activation, a BWP change, or SP CSI activation, if the terminal device can receive at least one time of CMR transmission and one time of IMR transmission at a location not later than a CSI reference resource, the terminal device reports a CSI report; or otherwise, the terminal device discards this CSI report (After the CSI report (re)configuration, serving cell activation, BWP change, or activation of SP-CSI, the UE reports a CSI report only after receiving at least one CSI-RS transmission occasion for channel measurement and CSI-RS and/or CSI-IM occasion for interference measurement no later than CSI reference resource and drops the report otherwise).

In actual implementation, a process such as CSI report configuration or reconfiguration, serving cell activation, a BWP change, or SP CSI activation includes the following operations: Operation 1: The network device delivers configuration or activation signaling. Operation 2: The terminal device correctly receives the signaling. Operation 3: The terminal device completes corresponding configuration based on the signaling, and can normally operate based on a new configuration or activation command.

In the foregoing three-operation process, a time of the third operation is fuzzy for the network device. Because terminal devices have different processing capabilities, times required for completing corresponding configuration are also different. Even for the same terminal device in different states, times required for completing corresponding configuration are also different.

For example, the CSI report reconfiguration is used as an example. The CSI report reconfiguration is completed by using RRC signaling. The RRC signaling is carried on a physical downlink shared channel (PDSCH). The network device delivers the PDSCH carrying the RRC signaling to the terminal device (that is, a first operation). The terminal device correctly receives the PDSCH, and feeds back ACK to the network device (that is, a second operation). Times of the foregoing two operations are clear and can be synchronized for both the network device and the terminal device. However, the terminal device parses out the RRC signaling carried on the PDSCH, and performs the CSI report reconfiguration based on the RRC signaling. In the 3GPP protocol, this process is fuzzy. The protocol specifies that a fuzzy period ranges from 5 milliseconds to 10 milliseconds. In this fuzzy period, the network device may fail to correctly receive uplink control information (UCI) reported by the terminal device.

As shown in FIG. 2, two CSI report reconfiguration scenarios are shown, that is, a scenario (a) and a scenario (b).

In the scenario (a) and the scenario (b), after the terminal device completes receiving of the PDSCH carrying the RRC signaling for the CSI report reconfiguration, before the uplink resource used for the CSI reporting is determined based on configuration information, the network device sends the CMR and the IMR. The CMR and the IMR are not later than a location of the CSI reference resource. A difference is that, in the scenario (a), the terminal device completes the CSI report reconfiguration more quickly, and can receive the CMR and the IMR that are sent by the network device; but in the scenario (b), the terminal device does not complete the CSI report reconfiguration in time, and cannot receive the CMR and the IMR that are sent by the network device.

However, the two cases of the scenario (a) and the scenario (b) are unknown to both the network device and terminal device before the terminal device completes the CSI report reconfiguration.

If the network device assumes the terminal device according to the case in the scenario (a) and the terminal device actually does not complete the CSI report reconfiguration in time, that is, the terminal device operates according to the case in the scenario (b), the terminal device discards the CSI reporting in the UCI based on the protocol. Because transmission of the UCI is not based on scheduling, the network device receives the UCI through blind detection. When the network device performs blind detection, a quantity of information bits is an important blind detection parameter.

A process in which the network device performs blind detection on the UCI is as follows: When sending the UCI, the terminal device generates a check bit based on valid information bits according to a preset rule, attaches the check bit to the UCI, and sends the UCI together with the check bit to the network device. After receiving the UCI, the network device generates a check bit based on the received valid information bits according to the same preset rule, compares the check bit with the received check bit, and when the check bits are consistent, determines that the UCI is correctly received; or otherwise, discards the received UCI.

In the foregoing case, if the network device assumes the terminal device according to the case in the scenario (a) but the terminal device actually operates according to the case in the scenario (b), the network device discards the received UCI, and cannot receive other information in the UCI sent by the terminal device. If the information further includes a very important HARQ feedback, link performance is greatly affected.

The same problem also occurs when the network device assumes the terminal device according to the scenario (b) but the terminal device actually operates according to the scenario (a). In this case, a CSI reporting bit that is expected to be discarded by the network device is surplus in the UCI. As a result, the network device cannot correctly receive the UCI, and link performance is greatly affected.

In view of this, embodiments of this application provide a CSI reporting method, a CSI receiving method, and a corresponding apparatus. Operations of both a network device and a terminal device in a configuration fuzzy period are restricted, to avoid a problem of receiving other important uplink information (for example, a HARQ feedback) caused because the network device and the terminal device have inconsistent understanding of whether CSI needs to be discarded in the configuration fuzzy period. For example, after CSI report configuration or reconfiguration, serving cell activation, a BWP change, or SP CSI activation, regardless of whether the terminal device can receive at least one time of CMR transmission and one time of IMR transmission at a location not later than a CSI reference resource, the terminal device reports CSI in UCI, and the network device receives the CSI in the UCI. The specific solutions are described in detail below.

The technical solutions in embodiments of this application may be applied to various communication systems, for example, a 4th generation (4G) communication system, a 5th generation (5G) communication system, a 6th generation (6G) communication system, another future evolved system, or various other wireless communication systems using a radio access technology. The technical solutions in embodiments of this application may be used provided that there is a positioning requirement in the communication system.

FIG. 3 is a diagram of network architecture of a communication system to which an embodiment of this application is applicable. The communication system includes a network device and a terminal device. Signals may be transmitted between the network device and the terminal device. The signals may be transmitted by using a radio wave, or may be transmitted by using a transmission medium such as visible light, a laser, infrared, or an optical fiber.

The terminal device may also be referred to as a terminal, and may be a device that provides a user with voice and/or data connectivity, for example, may be a handheld device with a wireless connection function, or a processing device connected to a wireless modem. The terminal device may communicate with a core network through a radio access network (RAN), and exchange a voice and/or data with the RAN. The terminal device may be user equipment (UE), a wireless terminal device, a mobile terminal device, a device-to-device (D2D) communication terminal device, a V2X terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communication service (PCS) phone, a cordless telephone set, a session initiation protocol (SIP) phone, a wireless local loop (WLL) station, or a personal digital assistant (PDA). The terminal device alternatively includes a limited device, for example, a device having low power consumption, a device having a limited storage capability, or a device having a limited computing capability. For example, the terminal device includes an information sensing device such as a barcode, radio frequency identification (RFID), a sensor, a global positioning system (GPS), or a laser scanner.

As an example instead of limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, for example, smart watches or smart glasses, and devices that focus on only one type of application function and need to work with other devices such as smartphones, such as various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

The network device includes, for example, an access network (AN) device and a radio access network (RAN) device. The access network device, for example, a base station (for example, an access point), may be a device, in an access network, that communicates with a wireless terminal device over an air interface through one or more cells. The base station may be configured to mutually convert a received over-the-air frame and an internet protocol (TP) packet, and serve as a router between the terminal device and a remaining part of the access network. The remaining part of the access network may include an IP network. The network device may further coordinate attribute management of the air interface. For example, the network device may include an evolved NodeB (NodeB, eNB, e-NodeB, or evolved NodeB) in a long term evolution (LTE) system or a long term evolution-advanced (LTE-A) system; may include a next generation NodeB (gNB), a next generation evolved NodeB (ng-eNB), or an enhanced next generation NodeB en-gNB (gNB) in a 5th generation (5G) mobile communication technology new radio (NR) system; may include a central unit (CU) and a distributed unit (DU) in a cloud access network (Cloud RAN) system; or may further include a relay device. This is not limited in embodiments of this application.

To make objectives, technical solutions, and advantages of embodiments of this application clearer, the following further describes the technical solutions of embodiments of this application in detail with reference to the accompanying drawings.

The terms "system" and "network" may be used interchangeably in embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof indicates any combination of these items, including any combination of singular items (pieces) or plural items (pieces). For example, at least one of a, b, or c may indicate a; b; c; a and b; a and c; b and c; or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

In addition, the terms "include" and "have" in the embodiments, claims, and accompanying drawings of this application are not exclusive. For example, a process, a method, a system, a product, or a device including a series of operations or modules is not limited to the listed operations or modules, and may further include operations or modules that are not listed.

FIG. 4 is a flowchart of a CSI reporting method according to an embodiment of this application. The method may be applied to the communication system shown in FIG. 3. The method includes the following operations:

S401: A terminal device determines a CSI state.

In this embodiment of this application, for the terminal device, the CSI state includes the following two types: (1) valid; and (2) invalid. At the same moment, the CSI state of the terminal device is unique, that is, the CSI state is valid or invalid. If the CSI state of the terminal device is not configured, the CSI state is considered as invalid.

When the CSI state is valid, the terminal device can read CSI from a storage unit. When the CSI state is invalid, there is no CSI in the storage unit, and the terminal device cannot read the CSI from the storage unit.

Specific implementation of the storage unit may be a register in the terminal device (for example, may be a small storage area specially used to store the CSI in a central processing unit (CPU)), or a storage unit in a modem chip specially used to process a radio signal in the terminal device. A specific implementation form of the storage unit is not limited in this application.

Optionally, in this embodiment of this application, the terminal device performs CSI measurement when a CSI measurement occasion arrives. For example, a location identified by using a white rectangle in FIG. 2 represents the CSI measurement occasion. After completing the CSI measurement, the terminal device stores the CSI obtained through measurement in a storage unit of the terminal device. After a CSI reporting occasion arrives, the terminal device reads the CSI from the storage unit to perform CSI reporting. For example, a location identified by using a black rectangle in FIG. 2 represents the CSI reporting occasion.

Correspondingly, that the terminal device determines the CSI state includes that the terminal device determines the CSI state when a CSI reading occasion arrives.

Further, in this embodiment of this application, the CSI measurement occasion is associated with the CSI reporting occasion, and the CSI measurement occasion arrives before the CSI reporting occasion associated with the CSI measurement occasion.

For semi-persistent CSI reporting and periodic CSI reporting, the CSI measurement occasion and the CSI reporting occasion both exist periodically. Each period has a pair of a CSI measurement occasion and a CSI reporting occasion that are associated. A difference is that in the semi-persistent CSI reporting, the terminal device starts CSI reporting only after receiving first downlink signaling sent by the network device, and ends the CSI reporting after receiving second downlink signaling. Between moments of delivering the two pieces of downlink signaling, the terminal device performs periodic CSI measurement and CSI reporting. In the periodic CSI reporting, the two pieces of downlink signaling are not needed to trigger or stop the periodic CSI measurement and CSI reporting.

For the aperiodic CSI reporting, CSI measurement and CSI reporting need to be triggered by the network device. However, after each time of triggering, there is only one pair of a CSI measurement occasion and a CSI reporting occasion that are associated. In other words, the terminal device performs measurement and reporting only once.

It should be understood that if the terminal device reads the CSI in the storage unit and reports the CSI in a CSI reporting occasion, the terminal device may update the state of the CSI in the storage unit to invalid, and after obtaining a new CSI measurement result in a next CSI measurement occasion, update the CSI measurement result and update the CSI state to valid.

The CSI state update process may also be update according to a type of the CSI. For example, for periodic CSI and semi-persistent CSI, if the terminal device reads the CSI in the storage unit and reports the CSI in a CSI reporting occasion, the CSI state remains valid. For aperiodic CSI, if the terminal device reads the CSI in the storage unit and reports the CSI in a CSI reporting occasion, the terminal device may update the CSI state in the storage unit to invalid, and after obtaining a new CSI measurement result in a next CSI measurement occasion, update the CSI measurement result and update the CSI state to valid.

Further optionally, in this embodiment of this application, the terminal device may set the CSI state to invalid at any moment at which the CSI cannot be obtained through calculation, and then set the CSI state to valid when the CSI is obtained through calculation.

In this embodiment of this application, there are a plurality of scenarios in which the terminal device cannot obtain the CSI through calculation.

For example, when the terminal device performs BWP switching configuration, the network device uses downlink information (the downlink information may be RRC signaling or DCI) to switch a BWP for the terminal device. Therefore, the terminal device needs to receive and decode content of the downlink information, and perform corresponding configuration based on the information content. This process has a configuration delay. Before the BWP switching is completed, the terminal device cannot perform CSI measurement. Therefore, in this scenario, even if the terminal device can determine that a CSI measurement occasion exists, if the measurement occasion is within the configuration delay, the terminal device cannot complete CSI measurement, and naturally cannot generate valid CSI information. In addition, when the terminal device performs BWP switching, there is still a switching delay (switch delay) time. During the switching delay time, radio frequency transmission and reception functions of the terminal device are interrupted, and no data transmission and reception operation can be performed. Therefore, in this scenario, even if the terminal device can determine that there is a CSI measurement occasion, if the CSI measurement occasion is within the switching delay time corresponding to the BWP switching performed by the terminal device (that is, the terminal device is in a BWP switching process), the terminal device also cannot receive a CMR and an IMR that are sent by the network device, and therefore cannot complete CSI measurement. The terminal device cannot complete CSI measurement, and naturally cannot generate valid CSI information. Therefore, the terminal device may set the CSI state to invalid when receiving a BWP switching message or after receiving a BWP switching message.

For example, when the terminal device performs CSI report configuration, because the network device uses RRC signaling to configure a CSI reporting parameter for the terminal device, the terminal device needs to receive and decode content of the RRC signaling, and perform corresponding configuration based on the content of the signaling. This process has a configuration delay. Before the configuration is completed, the terminal device cannot perform CSI measurement. Therefore, in this scenario, even if the terminal device can determine that a CSI measurement occasion exists, if the measurement occasion is within the configuration delay, the terminal device cannot complete CSI measurement, and naturally cannot generate valid CSI information. Therefore, the terminal device does not have the valid CSI when the CSI reporting occasion arrives. Therefore, the terminal device may set the CSI state to invalid when receiving a CSI report configuration message or after receiving a CSI report configuration message.

For example, when the terminal device performs CSI report reconfiguration, because the network device uses RRC signaling to reconfigure a CSI reporting parameter for the terminal device, the terminal device needs to receive and decode content of the RRC signaling, and perform corresponding configuration based on the content of the signaling. This process has a configuration delay. Before the configuration is completed, the terminal device cannot perform CSI measurement. Therefore, in this scenario, even if the terminal device can determine that a CSI measurement occasion exists, if the measurement occasion is within the configuration delay, the terminal device cannot complete CSI measurement, and naturally cannot generate valid CSI information. Therefore, the terminal device does not have the valid CSI when the CSI reporting occasion arrives. Therefore, the terminal device may set the CSI state to invalid when receiving a CSI report reconfiguration message or after receiving a CSI report reconfiguration message.

For example, when the terminal device performs serving cell activation, because the network device uses downlink control signaling to activate a serving cell for the terminal device, the terminal device needs to perform corresponding configuration based on content of the signaling. This process has a configuration delay. Before the configuration is completed, the terminal device cannot perform CSI measurement. Therefore, in this scenario, even if the terminal device can determine that a CSI measurement occasion exists, if the measurement occasion is within the configuration delay, the terminal device cannot complete CSI measurement, and naturally cannot generate valid CSI information. Therefore, the terminal device does not have the valid CSI when the CSI reporting occasion arrives. Therefore, the terminal device may set the CSI state to invalid when receiving a serving cell activation message or after receiving a serving cell activation message.

For example, when the terminal device performs SP CSI activation, because the network device uses downlink control signaling to activate SP CSI reporting for the terminal device, the terminal device needs to perform corresponding configuration based on content of the signaling. This process has a configuration delay. Before the configuration is completed, the terminal device cannot perform CSI measurement. Therefore, in this scenario, even if the terminal device can determine that a CSI measurement occasion exists, if the measurement occasion is within the configuration delay, the terminal device cannot complete CSI measurement, and naturally cannot generate valid CSI information. Therefore, the terminal device does not have the valid CSI when the CSI reporting occasion arrives. Therefore, the terminal device may set the CSI state to invalid when receiving an SP CSI activation message or after receiving an SP CSI activation message.

Certainly, the foregoing several trigger scenarios in which the terminal device cannot obtain the CSI through calculation are merely examples instead of limitation. In actual application, there may be another scenario in which the terminal device cannot obtain the CSI through calculation. Another possibility is not excluded herein.

In a possible design, the terminal device sets the CSI state to invalid for the received preset message. In other words, the preset message delivered by the network device may trigger the terminal device to set the CSI state to invalid. The preset message may be a message that causes any one of the foregoing scenarios to occur, for example, a CSI report configuration message, a CSI reconfiguration message, a serving cell activation message, a BWP switching message, or a semi-persistent CSI reporting activation message.

In a specific implementation, the terminal device sets the CSI state to invalid when receiving the preset message.

In another specific implementation, the terminal device sets the CSI state to invalid at a moment t after receiving the preset message. However, it is at least ensured that t is between a moment t1 at which the terminal device receives the preset message and a moment t2 at which the terminal device reads and reports the CSI. Further, when a moment t3 at which the terminal device obtains the valid CSI through measurement exists between the moment t1 of receiving the preset message and the moment t2 at which the terminal device reads and reports the CSI, the moment t at which the terminal device configures the CSI state to invalid should be between t1 and t3, and cannot be t3 or after t3. In other words, if the terminal device can measure the valid CSI before reading the CSI, it needs to be ensured that setting the CSI state to invalid occurs before the terminal device can measure and report the valid CSI. If the terminal device does not measure the valid CSI before reading the CSI, it only needs to be ensured that the setting occurs before an occasion in which the terminal device reads the CSI.

Certainly, the foregoing two implementations are merely examples instead of limitation of "setting the CSI state to invalid for the received preset message". Actually, other cases may be further included.

Further, cases in which the terminal device cannot obtain the CSI through calculation include the following several cases:

(1) Before the CSI reporting occasion arrives, there is no occasion for the terminal device to receive a CSI-RS used for channel measurement.

(2) Before the CSI reporting occasion arrives, there is no occasion for the terminal device to receive a CSI-RS and/or CSI-IM time-frequency resource used for interference measurement.

(3) Before the CSI reporting occasion arrives, there is neither an occasion for the terminal device to receive a CSI-RS used for channel measurement nor an occasion for the terminal device to receive a CSI-RS and/or CSI-IM used for interference measurement.

(4) Before the CSI reporting occasion arrives, there is an occasion for the terminal device to receive a CSI-RS used for channel measurement and an occasion for the terminal device to receive a CSI-RS and/or CSI-IM used for interference measurement. The occasion for the terminal device to receive the CSI-RS used for channel measurement is later than a time domain location of a CSI reference resource.

(5) Before the CSI reporting occasion arrives, there is an occasion for the terminal device to receive a CSI-RS used for channel measurement and an occasion for the terminal device to receive a CSI-RS and/or CSI-IM used for interference measurement. The occasion for the terminal device to receive the CSI-RS and/or the CSI-IM used for interference measurement is later than a time domain location of a CSI reference resource.

(6) Before the CSI reporting occasion arrives, there is an occasion for the terminal device to receive a CSI-RS used for channel measurement and an occasion for the terminal device to receive a CSI-RS and/or CSI-IM used for interference measurement. However, the occasion for the terminal device to receive the CSI-RS used for channel measurement and the occasion for the terminal device to receive the CSI-RS and/or the CSI-IM used for interference measurement are both later than a time domain location of a CSI reference resource.

It should be understood that any one of the foregoing six cases belongs to a case in which the terminal device cannot receive at least one time of CMR transmission and at least one time of EIR transmission at a location not later than the CSI reference resource.

Further, if the terminal device cannot receive at least one time of CMR transmission and at least one time of IMR transmission at the location not later than the CSI reference resource, the CSI state may remain invalid, or the CSI state may be set to invalid. If the terminal device receives at least one time of CMR transmission and at least one time of IMR transmission (that is, the CSI can be obtained through calculation) at a location not later than the CSI reference resource, and the terminal device completes corresponding configuration (for example, BWP switching, CSI report configuration, CSI report reconfiguration, serving cell activation, or SP CSI activation) before receiving the CMR and the IMR, the terminal device can obtain a valid CSI report. In this case, after obtaining the valid CSI information, the terminal device changes the CSI state to valid, and reports the CSI obtained through measurement to the storage unit.

S402: The terminal device sends the preset CSI when the CSI state is invalid.

When the CSI state is invalid, the terminal device sends the preset CSI when the CSI reporting occasion arrives. For example, after CSI report configuration and reconfiguration, serving cell activation, a BWP change, or SP CSI activation, if the terminal device cannot receive at least one time of CMR transmission and at least one time of IMR transmission at a location not later than a CSI reference resource, the terminal device reports the preset CSI.

In this embodiment of this application, the preset CSI may be designed in a plurality of manners.

In a possible design, the preset CSI may be default CSI. For example, the preset CSI may be a sequence of default values, for example, an all-1 bit sequence or an all-0 bit sequence.

In another possible design, the preset CSI may be a bit sequence in which bits of CQI are all 0s and values of other bits are not limited.

Certainly, the foregoing two designs are merely examples instead of limitation. During actual implementation, a possibility of another design is not excluded.

Optionally, the preset CSI is carried in UCI.

It should be noted that in this embodiment of this application, in addition to CSI reporting bits, the UCI may further include other uplink data, for example, an uplink HARQ feedback. During implementation of this embodiment of this application, information bits other than the CSI reporting bits in the UCI are not changed, to ensure transmission reliability of other uplink data.

Optionally, a bit length of the preset CSI is the same as a bit length required by the CSI configuration information.

The bit length of the preset CSI may be determined in a plurality of manners. This is not limited herein.

Example 1: After the terminal device receives a CSI report configuration message, in a process of performing CSI report configuration, although configuration of a CSI configuration parameter is involved, the terminal device may not complete the configuration of the CSI reporting parameter when first N CSI reporting occasions arrive. Therefore, a CSI configuration parameter corresponding to this time of CSI configuration cannot be determined. In this case, when the first N CSI reporting occasions arrive, the terminal device may determine a length of the CSI reporting bits based on preset CSI configuration parameters.

For example, the preset CSI configuration parameters include the following configuration parameters: periodic CSI reporting, cri-RI-PMI-CQI, a wideband CQI, and a wideband PMI. Each configuration parameter has a determined bit length. A length of the CSI reporting bits is a sum of bit lengths of all configuration parameters.

It should be understood that N herein is preset and may be any positive integer. A specific value is not limited in this application.

Example 2: After the terminal device receives a CSI report reconfiguration message, in a process of performing CSI report reconfiguration, although configuration of a CSI configuration parameter is involved, the terminal device may not complete the configuration of the CSI reporting parameter when first N CSI reporting occasions arrive. Therefore, a CSI configuration parameter corresponding to this time of CSI reconfiguration cannot be determined. In this case, when the first N CSI reporting occasions arrive, the terminal device also determines a length of the CSI reporting bits based on preset CSI configuration parameters, or determines a length of the CSI reporting bits by using an original (that is, before this time of CSI reconfiguration) CSI configuration parameter, for example, a CSI configuration parameter of a previous time of CSI configuration or CSI reconfiguration.

Example 3: After the terminal device receives a serving cell activation message, a BWP switching message, or an SP CSI activation message, in a process of performing the serving cell activation, the BWP switching, or the SP CSI activation, configuration of a CSI configuration parameter is not involved. Therefore, the terminal device can determine a length of the CSI reporting bits based on the configured CSI configuration parameter.

The configured CSI configuration parameter herein is a CSI configuration parameter configured for the terminal device before the serving cell activation, the BWP switching, or the SP CSI activation, for example, a CSI configuration parameter of a latest time of CSI configuration or CSI reconfiguration.

Certainly, the foregoing several manners of determining the length of the CSI reporting bits are merely examples instead of limitation. In actual application, there may be another manner of determining the length of the CSI reporting bits. Another possibility is not excluded herein.

S403: The network device receives the preset CSI.

In this embodiment of this application, an operation of the network device corresponds to an operation of the terminal device. For example, the network device may receive the preset CSI when the CSI reporting occasion arrives.

Further, the network device may receive the UCI, and receive the preset CSI in the UCI.

Further, a manner in which the network device determines the length of the CSI reporting bits when receiving the CSI is consistent with a manner in which the terminal device determines the length of the CSI reporting bits when reporting the CSI.

In this embodiment of this application, after each CSI reporting occasion arrives, the network device receives the CSI. If the CSI is CSI reported by the terminal device when the CSI state is invalid, the CSI is preset CSI, and the network device may discard the CSI. If the CSI is CSI reported by the terminal device when the CSI state is valid, the CSI is valid CSI, and the network device does not discard the CSI.

It should be understood that the network device does not know whether CSI reported each time is valid CSI or preset CSI, and the network device only considers that the terminal device reports CSI in each CSI reporting occasion.

For example, each time after receiving the UCI, the network device assumes that the UCI includes the CSI reporting bits, generates a check bit according to a preset rule, and compares the check bit with a check bit received in the UCI. When the check bits are consistent, it is considered that the UCI is correctly received. Further, the network device reads the CSI reporting bits in the UCI, finds that the CSI reporting bits in the UCI are an all-1 bit sequence or an all-0 bit sequence, and further determines that the CSI is the preset CSI reported by the terminal device when the CSI state is invalid. Therefore, the CSI can be discarded.

It can be learned from the foregoing description that the terminal device in this embodiment of this application sets the CSI state, sets the CSI state to invalid when the configuration fuzzy period arrives, and reports the preset CSI when the CSI state is invalid. The network device receives the preset CSI. In this way, the network device and the terminal device can have consistent understanding of whether the CSI needs to be discarded in the configuration fuzzy period (that is, the CSI is not discarded, and the terminal device reports the preset CSI), thereby avoiding a problem in the conventional technologies that other important uplink information (for example, a HARQ feedback) is lost because the network device and the terminal device have inconsistent understanding of whether CSI needs to be discarded in the configuration fuzzy period. Therefore, uplink transmission performance can be improved.

The embodiment described in FIG. 4 is described from a perspective of internal implementation of the terminal device. To be specific, the terminal device determines the CSI state based on whether the CSI can be read from the storage unit, and further determines whether to report the preset CSI or the valid CSI when the CSI reporting occasion arrives. In addition, embodiments of this application may be further described from a perspective of external implementation.

Figure 5:
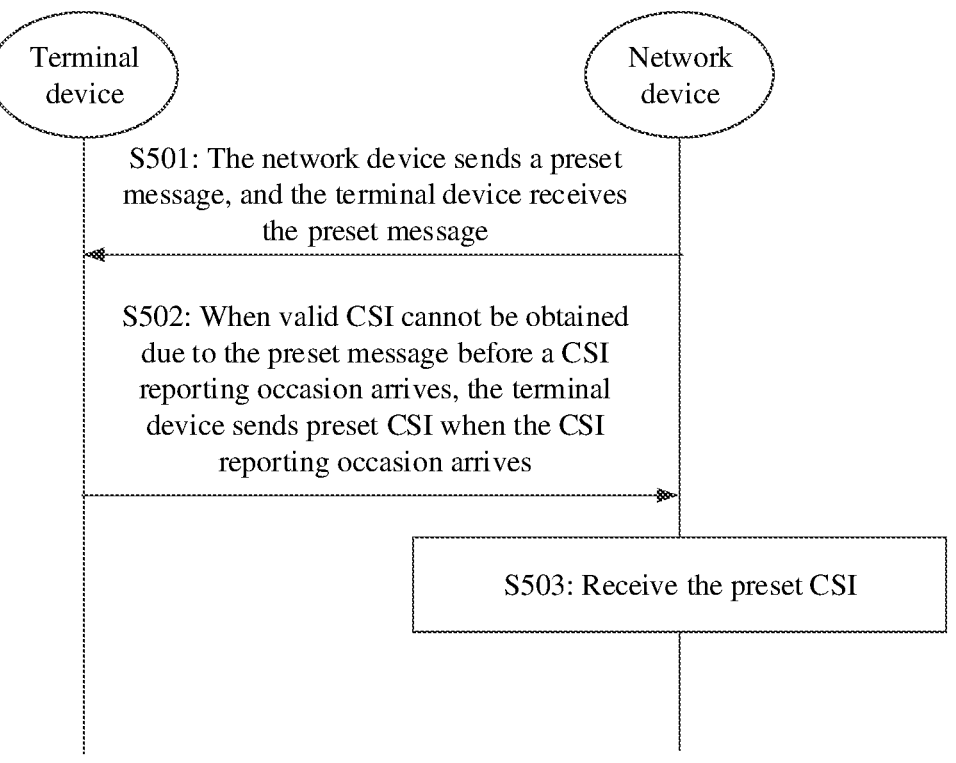
FIG. 5 is a flowchart of another CSI reporting method according to an embodiment of this application.

FIG. 5 is a flowchart of another CSI reporting method according to an embodiment of this application. The method may be applied to the communication system shown in FIG. 3. The method includes the following operations:

S501: A network device sends a preset message, and a terminal device receives the preset message.

Optionally, the preset message is one of the following messages: a CSI report configuration message; a CSI reconfiguration message; a serving cell activation message; a BWP switching message; and a semi-persistent CSI reporting activation message. For specific implementation of the foregoing various messages, refer to related descriptions in the embodiment shown in FIG. 4. Details are not described herein again.

S502: When valid CSI cannot be obtained due to the preset message before a CSI reporting occasion arrives, the terminal device sends preset CSI when the CSI reporting occasion arrives.

That the terminal device cannot obtain the valid CSI due to the preset message before the CSI reporting occasion arrives indicates that the terminal device cannot perform CSI measurement from a time at which the terminal device receives the preset message to a time at which the terminal completes configuration or activation corresponding to the preset message. Therefore, valid CSI information cannot be generated before the CSI reporting occasion arrives. For a configuration scenario or an activation scenario corresponding to the preset message, specific implementation of the preset CSI, and the like, refer to related descriptions in the embodiment shown in FIG. 4. Details are not described herein again.

S503: The network device receives the preset CSI.

For specific implementation in which the network device receives the preset CSI, refer to related descriptions in the embodiment shown in FIG. 4. Details are not described herein again.

It can be learned that the terminal device in this embodiment of this application receives the preset message from the network device; and when the valid CSI cannot be obtained due to the preset message before the CSI reporting occasion arrives, sends the preset CSI when the CSI reporting occasion arrives. The network device receives the preset CSI. In this way, the terminal device and the network device can have consistent understanding of whether the CSI needs to be discarded in a configuration fuzzy period (that is, the CSI is not discarded, and the preset CSI is reported), thereby avoiding a problem in the conventional technologies that other important uplink information (for example, a HARQ feedback) is lost because the network device and the terminal device have inconsistent understanding of whether the CSI needs to be discarded in the configuration fuzzy period. Therefore, uplink transmission performance can be improved.

In the embodiments shown in FIG. 4 and FIG. 5, when the CSI state is invalid (that is, when the terminal device receives the preset message and the valid CSI cannot be obtained due to the preset message before the CSI reporting occasion arrives), the terminal device may report the preset CSI provided that the CSI reporting occasion arrives. In this way, it can be well ensured that other uplink information other than the CSI can be accurately received by the network device.

Alternatively, in this embodiment of this application, the preset CSI may also be sent in a channel-associated manner. In other words, when the CSI state is invalid (or when the terminal device receives the preset message and the valid CSI cannot be obtained due to the preset message before the CSI reporting occasion arrives), when the CSI reporting occasion arrives, the terminal device reports the preset CSI only when other uplink data needs to be reported in the CSI reporting occasion. The preset CSI is carried and sent on a channel on which the other uplink data is located. On the contrary, if the other uplink data does not need to be reported in the CSI reporting occasion, the preset CSI may not be reported.

The preset CSI may be channel-associated in a plurality of manners. The following lists several possible implementations.

Example 1: The Terminal Device Sends the Preset CSI in the Channel-Associated Manner when Sending a HARQ Feedback The HARQ feedback is sent by the terminal device to the network device by using a PUCCH, and is used to notify the network device whether the PDSCH sent by the network device is correctly received. A CSI report and the HARQ feedback may be added to the same UCI to be sent by the terminal device to the network device on the PUCCH.

Therefore, when the CSI state is invalid (that is, when the terminal device receives the preset message and the valid CSI cannot be obtained due to the preset message before the CSI reporting occasion arrives), when the CSI reporting occasion arrives, if the HARQ feedback needs to be reported, the terminal device adds the preset CSI to the UCI used to carry the HARQ feedback.

Example 2: The Terminal Device Sends the Preset CSI in the Channel-Associated Manner when Sending Uplink Service Data NR specifies that a PUCCH may be loaded and sent on a PUSCH when the PUCCH and the PUSCH coexist in the same slot. Because the CSI is sent on (the UCI in) the PUCCH, when the PUCCH is loaded and sent on the PUSCH, a CSI report is also loaded on a PUSCH resource and sent to the network device together with other uplink data.

Therefore, when the CSI state is invalid (that is, when the terminal device receives the preset message and the valid CSI cannot be obtained due to the preset message before the CSI reporting occasion arrives), when the CSI reporting occasion arrives, if uplink service data needs to be sent, the terminal device adds the preset CSI to the PUSCH used to carry the uplink service data.

Example 3: The Terminal Device Sends the Preset CSI in the Channel-Associated Manner when Reporting Other CSI In CA, the network device may communicate with the terminal device by using a plurality of carrier components (CC). However, not all CCs have an uplink. For example, the network device configures two CCs for the terminal device. A CC 1 is a primary CC on which both an uplink frequency band and a downlink frequency band are configured. A CC 2 is a secondary CC on which only a downlink frequency band is configured. In this case, a CSI feedback corresponding to the CC 2 needs to be sent to the network device on the uplink frequency band of the CC 1 by using a PUCCH. When the CC 1 is normal and CSI report configuration or reconfiguration, serving cell activation, a BWP change, or SP CSI activation occurs on the CC 2, a CSI report corresponding to the CC 1 is normal. There is no fuzzy problem between the network device and the terminal device. However, there is a fuzzy problem only when the terminal device reports a CSI report corresponding to the CC 2. Therefore, the following case may occur: In a plurality of CSI reports reported by the terminal device in the same UCI, only some CSI reports have a fuzzy problem while other CSI reports do not.

In such a channel-associated design, after CSI report configuration or reconfiguration, serving cell activation, a BWP change, or SP CSI activation, if other information other than the CSI needs to be reported, it can be ensured that other uplink information other than the CSI can be accurately received by the network device. If no other uplink information needs to be reported, complexity of the terminal device and the network device can be reduced, and system overheads can be reduced.

It should be understood that the embodiments in this specification may be combined to implement different technical effects.

The foregoing describes the methods provided in embodiments of this application with reference to FIG. 4 and FIG. 5. The following describes apparatuses provided in embodiments of this application with reference to FIG. 6 to FIG. 10.

Based on the same technical concept, an embodiment of this application provides a communication apparatus 600. The communication apparatus 600 may be, for example, a terminal device or a chip device disposed in a terminal device. The apparatus 600 has a function of implementing the terminal device in the embodiment shown in FIG. 4. For example, the apparatus 600 includes a corresponding module, unit, or means (means) for performing the operations performed by the terminal device in the embodiment shown in FIG. 4. The function, unit, or means may be implemented by software or hardware, or may be implemented through executing corresponding software by hardware.

Figure 6:
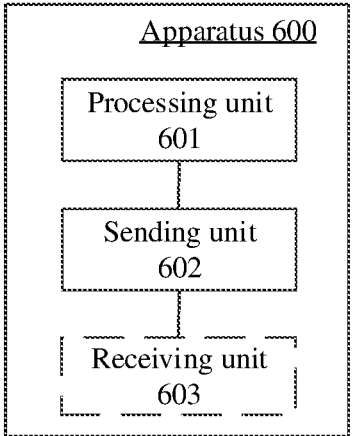
FIG. 6 is a schematic diagram of a structure of a communication apparatus according to an embodiment of this application.

For example, with reference to FIG. 6, the apparatus 600 may include a processing unit 601 and a sending unit 602.

The processing unit 601 is configured to determine a CSI state.

The sending unit 602 is configured to send preset CSI when the CSI state is invalid.

In a possible implementation, the processing unit 601 is configured to:

determine the CSI state when a CSI reading occasion arrives.

In a possible implementation, the reading occasion is associated with a CSI reporting occasion and arrives before the CSI reporting occasion. The processing unit 601 is configured to:

send preset CSI when the CSI reporting occasion arrives.

In a possible implementation, the apparatus further includes a receiving unit 603, configured to receive a preset message.

The processing unit 601 is further configured to set the CSI state to invalid for the received preset message.

In FIG. 6, a dashed line is used to indicate that the receiving unit 603 is optional for the apparatus 600.

In a possible implementation, the preset message is one of the following messages:

a CSI report configuration message;

a CSI reconfiguration message;

a serving cell activation message;

a bandwidth part switching message; and a semi-persistent CSI reporting activation message.

In a possible implementation, the processing unit 601 is further configured to set the CSI state to valid when the CSI is obtained through calculation.

In a possible implementation, the preset CSI is default CSI.

It should be understood that all related content of the operations in the foregoing method embodiments may be cited in function descriptions of the corresponding function modules. Details are not described herein again.

Based on the same technical concept, an embodiment of this application provides a communication apparatus 700. The communication apparatus 700 may be, for example, a terminal device or a chip device disposed in a terminal device. The apparatus 700 has a function of implementing the terminal device in the embodiment shown in FIG. 5. For example, the apparatus 700 includes a corresponding module, unit, or means (means) for performing the operations performed by the terminal device in the embodiment shown in FIG. 5. The function, unit, or means may be implemented by software or hardware, or may be implemented through executing corresponding software by hardware.

Figure 7:
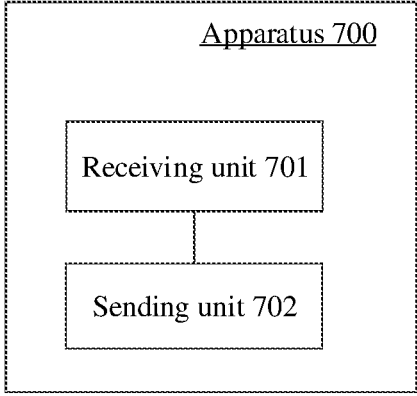
FIG. 7 is a schematic diagram of a structure of another communication apparatus according to an embodiment of this application.

For example, with reference to FIG. 7, the apparatus 700 may include a receiving unit 701 and a sending unit 702.

The receiving unit 701 is configured to receive a preset message.

The sending unit 702 is configured to: when valid CSI cannot be obtained due to the preset message before a CSI reporting occasion arrives, send preset CSI when the CSI reporting occasion arrives.

In a possible implementation, the preset message is one of the following messages:

a CSI report configuration message;

a CSI reconfiguration message;

a serving cell activation message;

a bandwidth part switching message; and a semi-persistent CSI reporting activation message.

In a possible implementation, the preset CSI is default CSI.

It should be understood that all related content of the operations in the foregoing method embodiments may be cited in function descriptions of the corresponding function modules. Details are not described herein again.

Based on the same technical concept, an embodiment of this application provides a communication apparatus 800. The communication apparatus 800 may be, for example, a network device or a chip device disposed in a network device. The apparatus 800 has a function of implementing the network device in the embodiment shown in FIG. 4 or FIG. 5. For example, the apparatus 800 includes a corresponding module, unit, or means for performing the operations performed by the network device in the embodiment shown in FIG. 4 or FIG. 5. The function, unit, or means may be implemented by software or hardware, or may be implemented through executing corresponding software by hardware.

Figure 8:
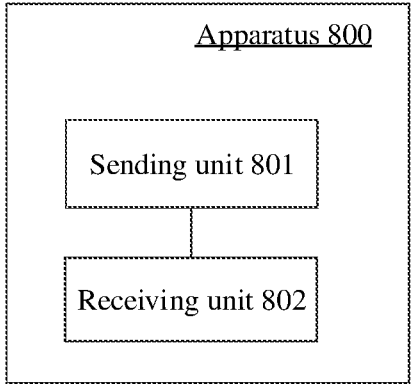
FIG. 8 is a schematic diagram of a structure of another communication apparatus according to an embodiment of this application.

For example, with reference to FIG. 8, the apparatus 800 may include a sending unit 801 and a receiving unit 802.

The sending unit 801 is configured to send a preset message.

The receiving unit 802 is configured to receive preset CSI in a CSI reporting occasion.

In a possible implementation, the preset message is one of the following messages:

a CSI report configuration message;

a CSI reconfiguration message;

a serving cell activation message;

a bandwidth part switching message; and a semi-persistent CSI reporting activation message.

In a possible implementation, the preset CSI is default CSI.

It should be understood that all related content of the operations in the foregoing method embodiments may be cited in function descriptions of the corresponding function modules. Details are not described herein again.

Figure 9:
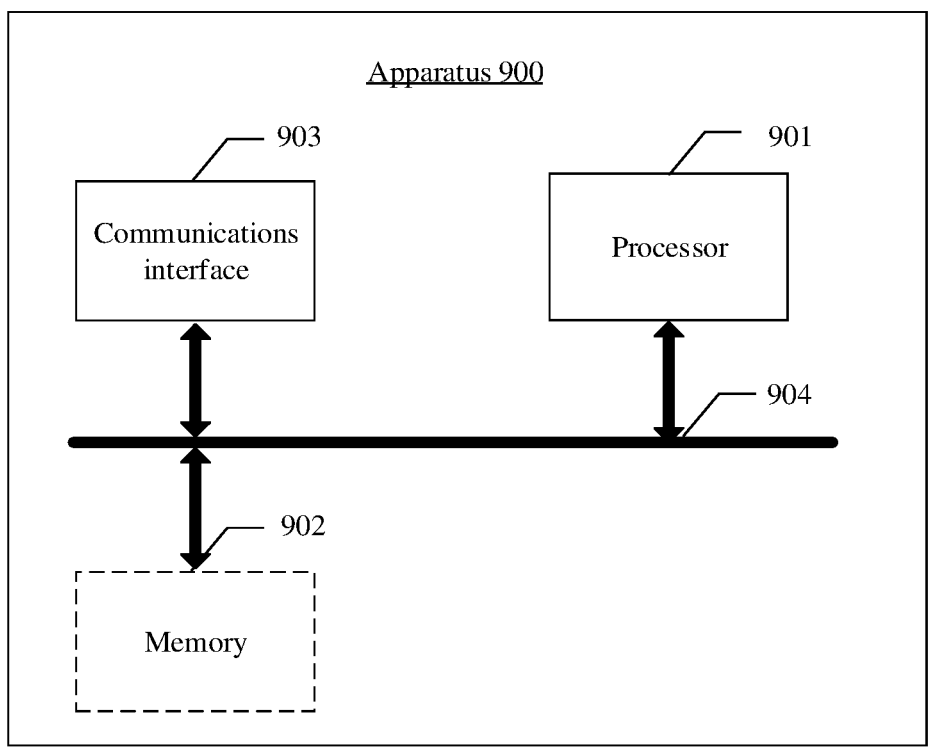
FIG. 9 is a schematic diagram of a structure of another communication apparatus according to an embodiment of this application.

Based on the same technical concept, with reference to FIG. 9, an embodiment of this application further provides a communication apparatus 900. The communication apparatus 900 includes:

at least one processor 901 and a communication interface 903 communicatively connected to the at least one processor 901, where the at least one processor 901 executes instructions stored in the memory 902, so that the apparatus performs, by using the communication interface 903, the method operations performed by the terminal device in the embodiment shown in FIG. 4 or FIG. 5.

Optionally, the memory 902 is located outside the apparatus 900.

Optionally, the apparatus 900 includes the memory 902. The memory 902 is connected to the at least one processor 901, and the memory 902 stores instructions that can be executed by the at least one processor 901.

Optionally, the memory 902 is located outside the apparatus 900.

Optionally, the apparatus 900 includes the memory 902. The memory 902 is connected to the at least one processor 901, and the memory 902 stores instructions that can be executed by the at least one processor 901. In FIG. 9, a dashed line indicates that the memory 902 is optional for the apparatus 900.

The processor 901 and the memory 902 may be coupled through an interface circuit, or may be integrated together. This is not limited herein.

A specific connection medium between the processor 901, the memory 902, and the communication interface 903 is not limited in this embodiment of this application. In this embodiment of this application, the processor 901, the memory 902, and the communication interface 903 are connected through a bus 904 in FIG. 9. The bus is represented by a thick line in FIG. 9. The connection manner between other components is merely an example for description, and is not limited thereto. The bus may be classified into an address bus, a data bus, a control bus, and the like. For ease of representation, only one thick line is used to represent the bus in FIG. 9, but this does not mean that there is only one bus or only one type of bus.

Figure 10:
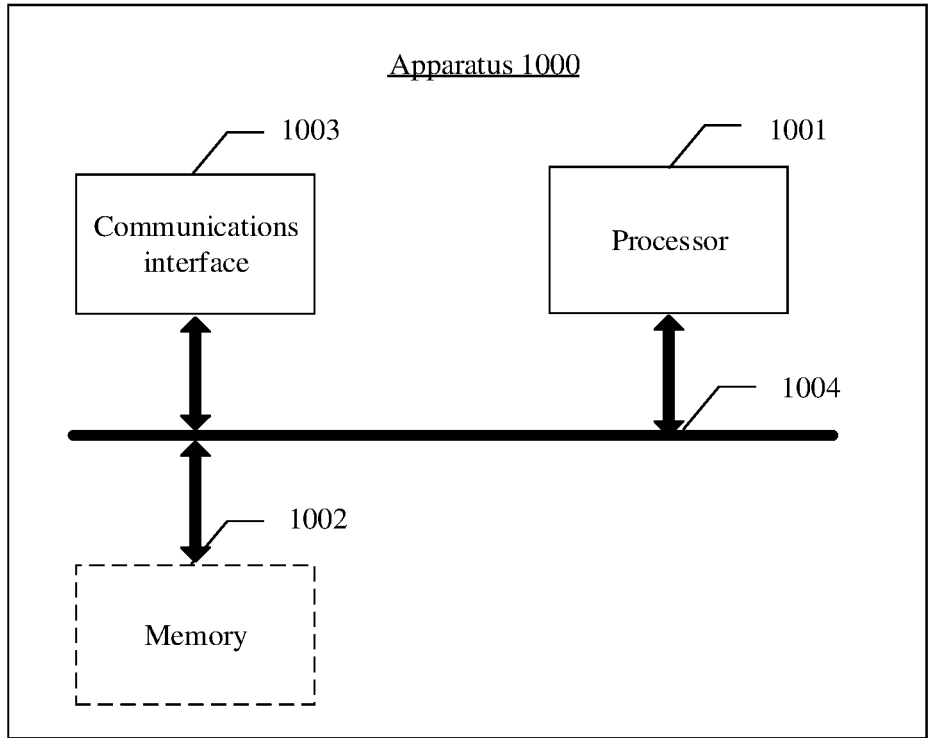
FIG. 10 is a schematic diagram of a structure of another communication apparatus according to an embodiment of this application.

Based on the same technical concept, with reference to FIG. 10, an embodiment of this application further provides a communication apparatus 1000. The communication apparatus 1000 includes:

at least one processor 1001 and a communication interface 1003 communicatively connected to the at least one processor 1001, where the at least one processor 1001 executes instructions stored in the memory 1002, so that the apparatus performs, by using the communication interface 1003, the method operations performed by the network device in the embodiment shown in FIG. 4 or FIG. 5.

Optionally, the memory 1002 is located outside the apparatus 1000.

Optionally, the apparatus 1000 includes the memory 1002. The memory 1002 is connected to the at least one processor 1001, and the memory 1002 stores instructions that can be executed by the at least one processor 1001.

Optionally, the memory 1002 is located outside the apparatus 1000.

Optionally, the apparatus 1000 includes the memory 1002. The memory 1002 is connected to the at least one processor 1001, and the memory 1002 stores instructions that can be executed by the at least one processor 1001. In FIG. 10, a dashed line indicates that the memory 1002 is optional for the apparatus 1000.

The processor 1001 and the memory 1002 may be coupled through an interface circuit, or may be integrated together. This is not limited herein.

A specific connection medium between the processor 1001, the memory 1002, and the communication interface 1003 is not limited in this embodiment of this application. In this embodiment of this application, the processor 1001, the memory 1002, and the communication interface 1003 are connected through a bus 1004 in FIG. 10. The bus is represented by a thick line in FIG. 10. The connection manner between other components is merely an example for description, and is not limited thereto. The bus may be classified into an address bus, a data bus, a control bus, and the like. For ease of representation, only one thick line is used to represent the bus in FIG. 10, but this does not mean that there is only one bus or only one type of bus.

It should be understood that the processor mentioned in this embodiment of this application may be implemented by hardware or may be implemented by software. When the processor is implemented by the hardware, the processor may be a logic circuit, an integrated circuit, or the like. When the processor is implemented by the software, the processor may be a general-purpose processor, and is implemented through reading software code stored in the memory.

For example, the processor may be a central processing unit (CPU), or may be another general-purpose processor, a digital signal processor (DSP), an application-specific integrated circuit (ASIC), a field programmable gate array (FPGA), another programmable logic device, a discrete gate, a transistor logic device, a discrete hardware component, or the like. The general-purpose processor may be a microprocessor, or the processor may be any conventional processor or the like.

It may be understood that the memory mentioned in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example instead of limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be noted that the memory described in this specification is intended to include but not limited to these memories and any memory of another appropriate type.

Based on the same technical concept, an embodiment of this application further provides a computer-readable storage medium, including programs or instructions. When the programs or the instructions are run on a computer, the method performed by the network device in the embodiment shown in FIG. 4 or FIG. 5 is performed.

Based on the same technical concept, an embodiment of this application further provides a computer-readable storage medium, including programs or instructions. When the programs or the instructions are run on a computer, the method performed by the terminal device in the embodiment shown in FIG. 4 or FIG. 5 is performed.

Based on the same technical concept, an embodiment of this application further provides a chip. The chip is coupled to a memory, and is configured to read and execute programs and instructions stored in the memory, so that the method performed by the network device in the embodiment shown in FIG. 4 or FIG. 5 is performed.

Based on the same technical concept, an embodiment of this application further provides a chip. The chip is coupled to a memory, and is configured to read and execute programs and instructions stored in the memory, so that the method performed by the terminal device in the embodiment shown in FIG. 4 or FIG. 5 is performed.

Based on the same technical concept, an embodiment of this application further provides a computer program product, including instructions. When the instructions are run on a computer, the method performed by the network device in the embodiment shown in FIG. 4 or FIG. 5 is performed.

Based on the same technical concept, an embodiment of this application further provides a computer program product, including instructions. When the instructions are run on a computer, the method performed by the terminal device in the embodiment shown in FIG. 4 or FIG. 5 is performed.

Based on the same technical concept, an embodiment of this application further provides a communication system, including the terminal device and the network device in the foregoing embodiments.

The communication apparatus 600, the communication apparatus 700, the communication apparatus 800, the communication apparatus 900, and the communication apparatus 1000 provided in embodiments of this application may be configured to perform the method provided in the corresponding embodiment in the embodiment shown in FIG. 4 or FIG. 5. Therefore, for technical effects that can be achieved by these apparatuses, refer to the foregoing method embodiments. Details are not described herein again.

Embodiments of this application are described with reference to the flowcharts and/or the block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or the functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state disk (SSD)), or the like.

What is claimed is:

1. A channel state information (CSI) reporting method, comprising:

in response to receiving a preset message, performing a configuration process corresponding to the preset message, wherein the configuration process has a configuration delay during which CSI is not obtainable, and setting a CSI state to invalid;

determining the CSI state upon arrival of a CSI reading occasion; and sending preset CSI in response to determining the CSI state as being invalid, wherein the CSI state is determined as invalid in response to the CSI reading occasion arriving within the configuration delay.

2. The method according to claim 1, wherein the preset message is:

a serving cell activation message; or a bandwidth part switching message.

3. The method according to claim 1, wherein the CSI reading occasion is associated with a CSI reporting occasion and arrives before the CSI reporting occasion, and the sending the preset CSI is sending the preset CSI in response to arrival of the CSI reporting occasion.

4. The method according to claim 1, wherein the sending the preset CSI comprises sending the preset CSI to a network device to indicate to the network device that the CSI state is invalid and that the network device is to discard the preset CSI.

5. The method according to claim 1, wherein the preset message is one selected from the group consisting of:

a CSI report configuration message;

a CSI reconfiguration message; and a semi-persistent CSI reporting activation message.

6. The method according to claim 1, further comprising, after the setting the CSI state to invalid in response to the preset message:

setting the CSI state to valid in response to obtaining the CSI through calculation.

7. The method according to claim 1, wherein the preset CSI is default CSI.

8. A communication apparatus, comprising:

a transceiver;

at least one processor; and one or more memories coupled to the at least one processor and storing programming instructions which are executable by the at least one processor to cause the communication apparatus to:

in response to receiving a preset message, perform a configuration process corresponding to the preset message, wherein the configuration process has a configuration delay during which channel state information (CSI) is not obtainable, and set a CSI state to invalid;

determine the CSI state upon arrival of a CSI reading occasion; and send preset CSI in response to determining the CSI state as being invalid, wherein the CSI state is determined as invalid in response to the CSI reading occasion arriving within the configuration delay.

9. The apparatus according to claim 8, wherein the preset message is:

a serving cell activation message; or a bandwidth part switching message.

10. The apparatus according to claim 8, wherein the CSI reading occasion is associated with a CSI reporting occasion and arrives before the CSI reporting occasion, and the programming instructions are executable by the at least one processor to further cause the communication apparatus to send the preset CSI in response to arrival of the CSI reporting occasion.

11. The apparatus according to claim 8, wherein the programming instructions are executable by the at least one processor to further cause the communication apparatus to send the preset CSI to a network device to indicate to the network device that the CSI state is invalid and that the network device is to discard the preset CSI.

12. The apparatus according to claim 8, wherein the preset message is one selected from the group consisting of:

a CSI report configuration message;

a CSI reconfiguration message; and a semi-persistent CSI reporting activation message.

13. The apparatus according to claim 8, wherein the programming instructions are executable by the at least one processor to further cause the communication apparatus to:

after setting the CSI state to invalid in response to the preset message, set the CSI state to valid in response to obtaining the CSI through calculation.

14. The apparatus according to claim 8, wherein the preset CSI is default CSI.

15. A non-transitory computer-readable storage medium, comprising programs or instructions executable by a computer to cause the computer to perform operations comprising:

in response to receiving a preset message, performing a configuration process corresponding to the preset message, wherein the configuration process has a configuration delay during which channel state information (CSI) is not obtainable, and setting a CSI state to invalid;

determining the CSI state upon arrival of a CSI reading occasion; and sending preset CSI in response to determining the CSI state as being invalid, wherein the CSI state is determined as invalid in response to the CSI reading occasion arriving within the configuration delay.

16. The non-transitory computer-readable storage medium according to claim 15, wherein the preset message is: a serving cell activation message; or a bandwidth part switching message.

17. The non-transitory computer-readable storage medium according to claim 15, wherein the sending the preset CSI is sending the preset CSI to a network device to indicate to the network device that the CSI state is invalid and that the network device is to discard the preset CSI.

18. The non-transitory computer-readable storage medium according to claim 15, wherein the operations further comprise, after the setting the CSI state to invalid in response to the preset message: setting the CSI state to valid in response to obtaining the CSI through calculation.

19. The non-transitory computer-readable storage medium according to claim 15, wherein the preset message is one selected from the group consisting of: a CSI report configuration message; a CSI reconfiguration message; and a semi-persistent CSI reporting activation message.

20. The non-transitory computer-readable storage medium according to claim 15, wherein the preset CSI is default CSI.

\* \* \* \* \*